United States Patent [19]

Wilhite et al.

[11] Patent Number: 4,471,432
[45] Date of Patent: Sep. 11, 1984

[54] METHOD AND APPARATUS FOR INITIATING THE EXECUTION OF INSTRUCTIONS USING A CENTRAL PIPELINE EXECUTION UNIT

[76] Inventors: John E. Wilhite, 8225 N. 45th Ave., Glendale, Ariz. 85302; William A. Shelly, 4900 E. Osborn Rd., Phoenix, Ariz. 85018; Russell W. Guenthner, 8613 N. 50th La., Glendale, Ariz. 85302; Leonard G. Trubisky, 6725 E. Horseshore La., Scottsdale, Ariz. 85253; Joseph C. Circello, 3209 W. Mercer La., Phoenix, Ariz. 85029

[21] Appl. No.: 434,196

[22] Filed: Oct. 13, 1982

[51] Int. Cl.[3] .............................................. G06F 9/38
[52] U.S. Cl. .................................................... 364/200
[58] Field of Search .......................... 364/200 MS File

[56] References Cited
U.S. PATENT DOCUMENTS

| | | | |
|---|---|---|---|
| 4,225,920 | 9/1980 | Stokes | 364/200 |
| 4,228,497 | 10/1980 | Gupta et al. | 364/200 |

Primary Examiner—Raulfe B. Zache
Attorney, Agent, or Firm—E. W. Hughes

[57] ABSTRACT

A method and a central execution pipeline unit for initiating the execution of instructions of a synchronous central processor unit (CPU) of a general-purpose digital data processing system. Instructions containing address information and an instruction field are obtained in program order from an instruction fetch unit of the CPU. In a first stage, requiring one clock period, the address information of an instruction is utilized to form the carrys and sums of an effective address and to initiate the formation of a virtual address. Concurrently, the instruction field is decoded to produce memory command signals and data alignment signals. In a second stage, the formation of the effective and virtual addresses initiated in the first stage is completed, and the word address portion of the virtual address is transmitted to the cache unit of the CPU. Also during the second stage, memory command signals are sent to the cache unit and the instruction field is converted to an execution code for one of a plurality of execution units, and the execution unit to execute the code is designated. In a third stage, the virtual address is converted to a physical address, or real page number, which is transmitted to the cache unit. The execution code is sent to the designated execution unit; however, if the execution unit is the central unit, the execution unit is the central unit, the execution code for that unit is converted into execution unit control signals. In the fourth stage, data alignment control signals are sent to a distributor of the central execution pipeline unit.

10 Claims, 9 Drawing Figures

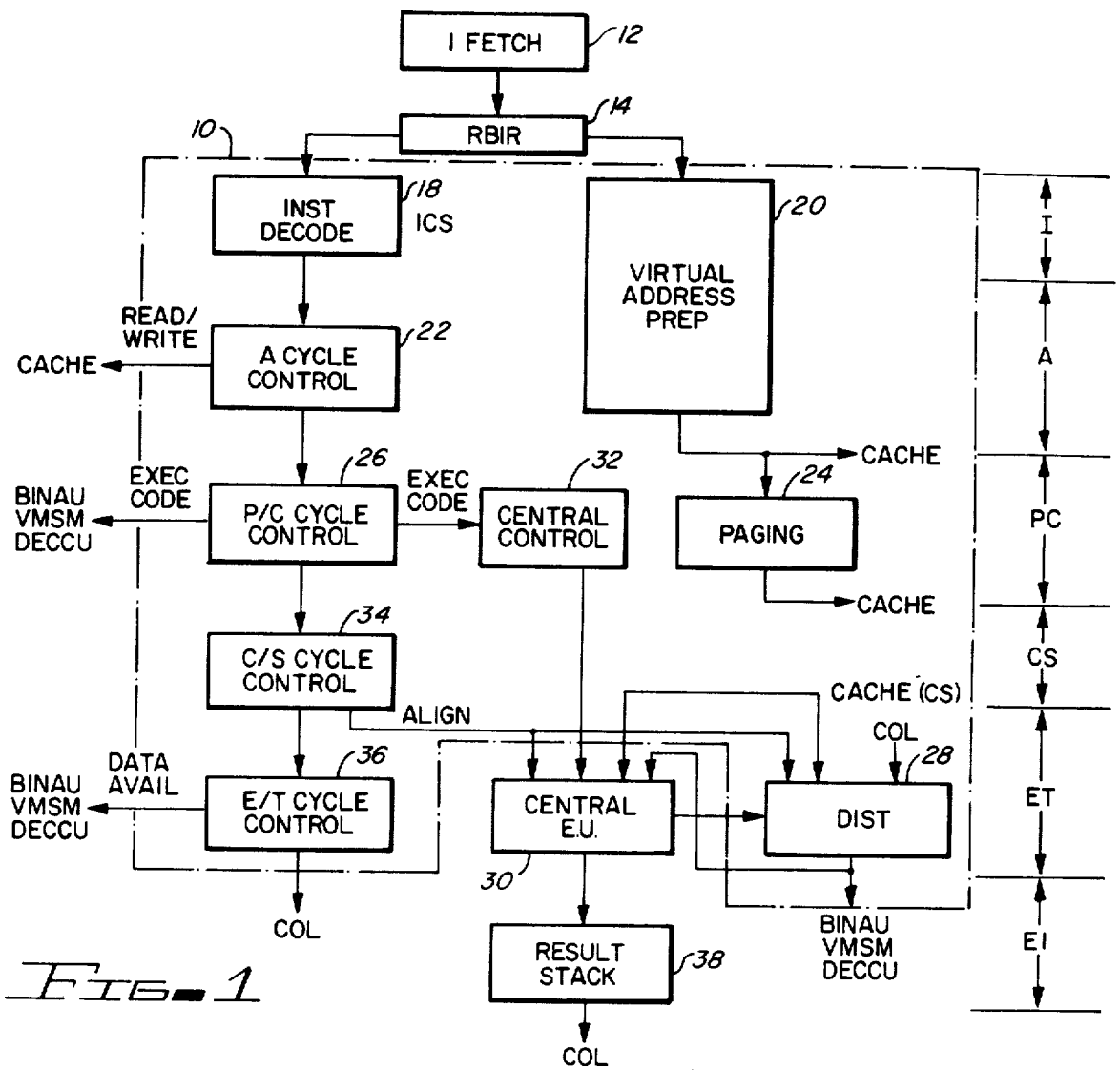
*Fig-1*
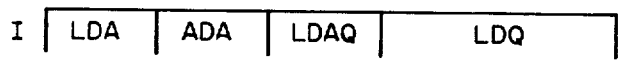
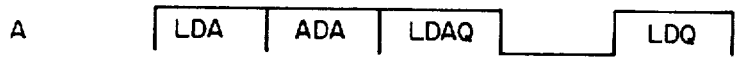
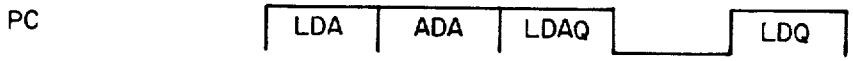
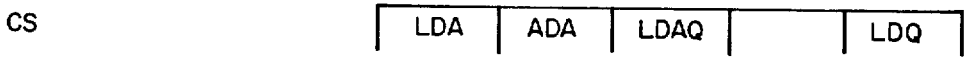
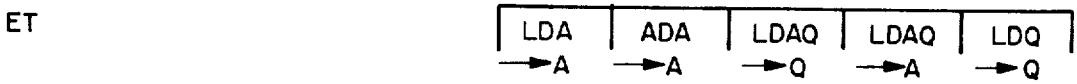
*Fig-9*

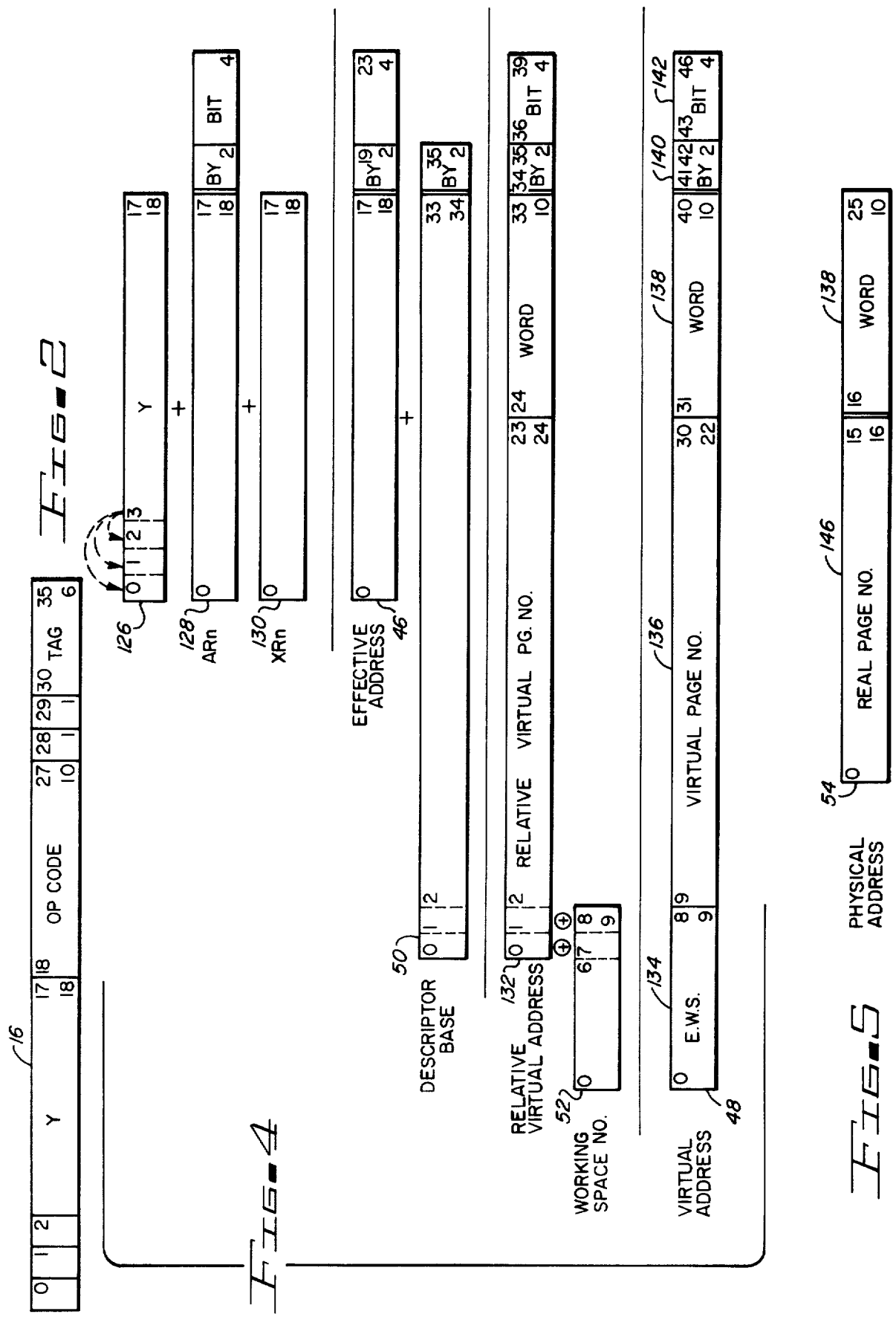

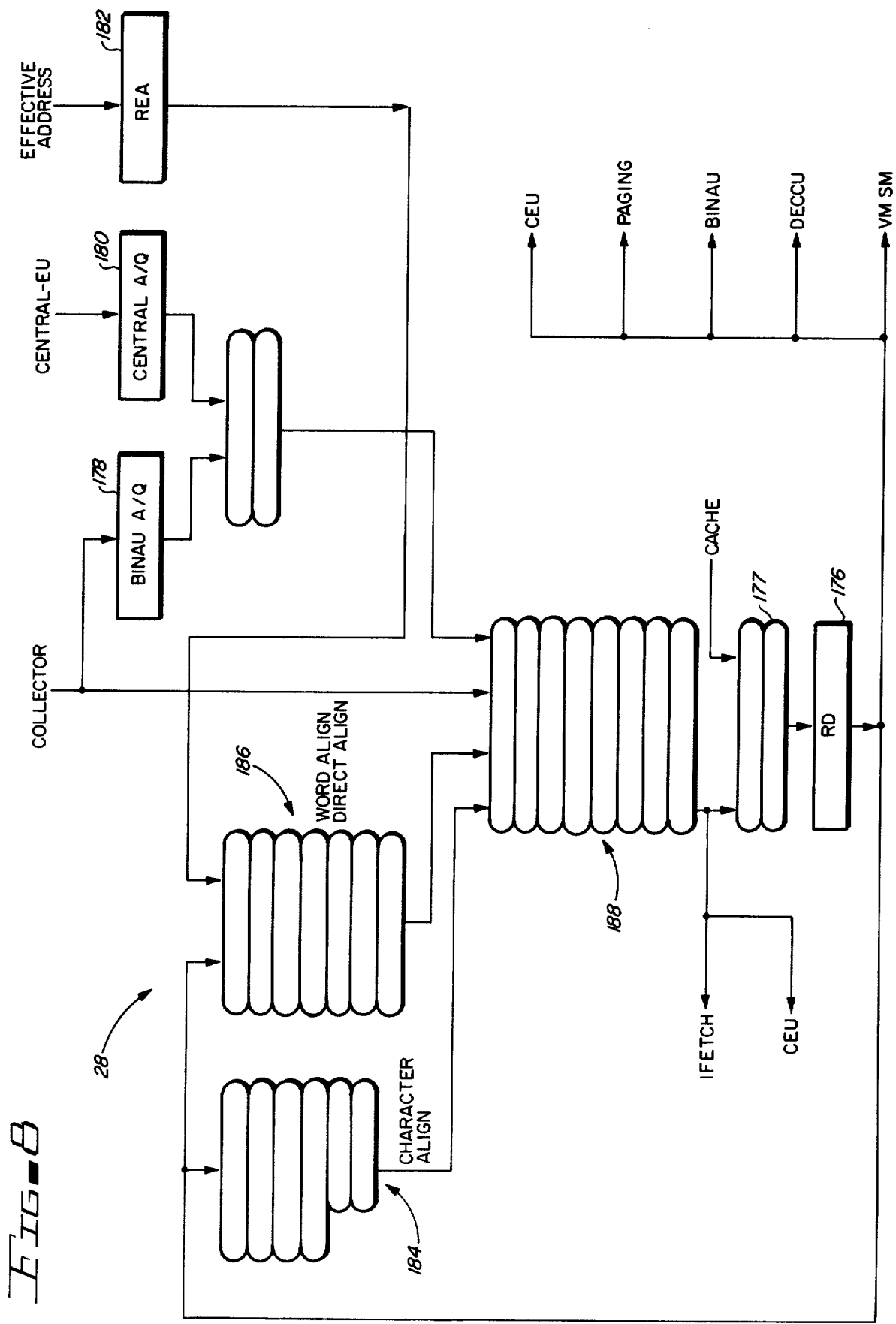

METHOD AND APPARATUS FOR INITIATING THE EXECUTION OF INSTRUCTIONS USING A CENTRAL PIPELINE EXECUTION UNIT

CROSS-REFERENCE TO RELATED APPLICATIONS

The following copending currently filed applications relate to the present application and are incorporated herein by reference:

A. "Central Processor" invented by William A. Shelly and Leonard G. Trubisky;

B. "Method and Apparatus for Prefetching Instructions" invented by Russell W. Guenthner, William A. Shelly, Gary R. Presley-Nelson, and Kala J. Marietta;

C. "Collector" invented by Russell W. Guenthner, Gregory C. Edgington, Leonard G. Trubisky, and Joseph C. Circello; and D. "Distributor" invented by John E. Wilhite and William A. Shelly.

All of the foregoing are assigned to the same assignee.

BACKGROUND OF THE INVENTION

1. Field of the Invention

This invention is in the field of synchronous central processor units of large-scale, high-performance, general-purpose, digital data processing systems. More particularly, this invention relates to a method and apparatus for initiating the execution of instructions in a series of stages, each stage of which requires a single clock period so that, under optimum circumstances, an instruction is executed or is ready for execution by one of a plurality of execution units at a rate of one per clock period.

2. Description of the Prior Art

To increase the performance of central processing units (CPU's) of data processing systems of which they are a part, many modifications and improvements have been incorporated into such CPU's. One such modification is the use of a high-speed cache unit located in the CPU to minimize the time required to fetch operands and instructions. To further increase the performance of CPU's, they are synchronized. i.e., a clock produces a clock pulses which control each step, or stage, of the operation of the CPU. Synchronization permits paralleling, overlapping, or pipelining the execution of instructions by dividing the process of executing each instruction into a number of sequential steps, with each instruction going through the same sequence of steps one after another.

In a CPU having several execution units, with each execution unit being capable of executing a subset of the instruction repertoire of the CPU, it is desirable that the process of initiating the execution of instructions, including the fetching of the operand, or target word, of each instruction, be conducted in a series of steps or stages, each requiring one clock period to complete and through whch each instruction progresses so that, at the completion of the last stage, an instruction and its operand or target word is available and ready for execution or is executed by the appropriate execution unit, including those instructions which require only a single clock period to execute.

SUMMARY OF THE INVENTION

The present invention provides an improved method and apparatus, a central execution pipeline unit (CEPU), for initiating the execution of instructions in a synchronous CPU of a general-purpose digital data processing system. Instruction words, or instructions, which contain address information and an instruction field or operation code, are obtained in program order from an instruction fetch unit (IFU) of the CPU and are stored in a basic instruction register (RBIR). In the first stage, or instruction cycle (I cycle) of the CEPU, the address information of the instruction is utilized, together with the contents of designated registers of the CEPU, to form the carrys and sums of an effective address and to initiate the development of a virtual address of the operand or target word of the instruction, hereinafter sometimes referred to as the target word. Also during the I cycle, the operation code of the instruction is decoded by an instruction cycle control store, which produces memory and data alignment control signals, as well as other control signals needed by the CEPU or other components of the CPU. In the second stage, or the address cycle (A cycle), the formation of the effective and virtual addresses of the target word initiated in the first stage is completed and the word address portion of the virtual address, the eleven lowest order bits of the virtual address, is transmitted to the cache unit of the CPU. Also during the A cycle, memory control signals are also transmitted to the cache unit of the CPU and the operation code of the instruction is applied to an A cycle control store, which produces execution code subsequently utilized by the execution units of the CPU to implement the execution of the instruction and signals which identify, or designate, which execution unit is to execute the execution code. In the third stage, or the paging and cache cycle (P/C cycle), the virtual page number, the upper 33 bits of the virtual address, is converted by a paging unit of the CEPU to a physical address, or real page number (RPN), in the preferred embodiment the upper 16 bits of the address, or location, of the operand in the random access memory of the system, and this RPN is transmitted to the cache unit to complete the provision of necessary information for the set associative cache unit to identify the addressed operand. Also during the P/C cycle, the execution code is sent to the designated execution unit. If the designated execution unit is the central execution unit which may execute instructions in a single clock period, the execution code is converted to execution unit control signals usable by the central ececution unit by the basic operations control store. In the fourth stage, the compare and select cycle (C/S cycle), alignment control signals are sent to the distributor, and the cache unit determines if the addressed target word is in the cache and, if it is, the cache unit transmits the addressed target word to the distributor where it is aligned as directed by the alignment control signals and to the central execution unit (CEU). In the fifth stage, or execute and transmit cycle (E/T cycle), the designated execution unit, if an execution unit other than the CEU, is enabled to receive the addressed and aligned target word from the distributor, the op code of the instruction is transmitted to the collector, and, if the designated execution unit is the CEU, execution control signals are transmitted to the CEU so that it can execute the designated instruction on the target word received from the cache in the C/S cycle. During the next cycle (E/T+1 cycle), the results of the execution by the CEU during the E/T cycle are loaded into the CEU's results stack and the indicator registers of the CEPU are updated if affected.

It is, therefore, an object of this invention to provide an improved method and central execution pipeline unit for a synchronous central processor unit.

It is another object of this invention to provide a method and central execution pipeline unit of a CPU which initiates the execution of instructions, forms the address and obtains the target word for each instruction as it passes through the pipeline unit so that instruction and its target word are available, under optimum circumstances, for execution by a designated one of a plurality of execution units at a rate of one per clock period of the CPU.

It is yet another object of this invention to provide a method and apparatus for a central processor unit of a high-performance, general-purpose, digital data processing system which initiates the execution of instructions, forms the address of the target word of each instruction, obtains the target word, and distributes the necessary control information to the designated one of a plurality of execution units so that the designated execution unit may perform the desired operation on the target word in a manner which maximizes the performance of the central processor.

BRIEF DESCRIPTION OF THE DRAWINGS

Other objects, features and advantages of the invention will be readily apparent from the following description of a preferred embodiment thereof taken in conjunction with the accompanying drawings, although variations and modifications may be effected without departing from the spirit and scope of the novel concepts of the disclosure and in which:

FIG. 1 is a schematic block diagram of the central execution pipeline unit (CEPU);

FIG. 2 is the format of an instruction word;

FIG. 4 illustrates the formats of the information provided to and produced by the address formation logic of the CEPU during each cycle in producing an effective address and the virtual address of a target word of an instruction;

FIG. 5 is the format of the physical address of a target word of an instruction;

FIG. 8 is a schematic circuit diagram of the collector of the CEPU; and

FIG. 9 illustrates the flow of instructions through the CEPU.

DESCRIPTION OF THE INVENTION

Figure 3:
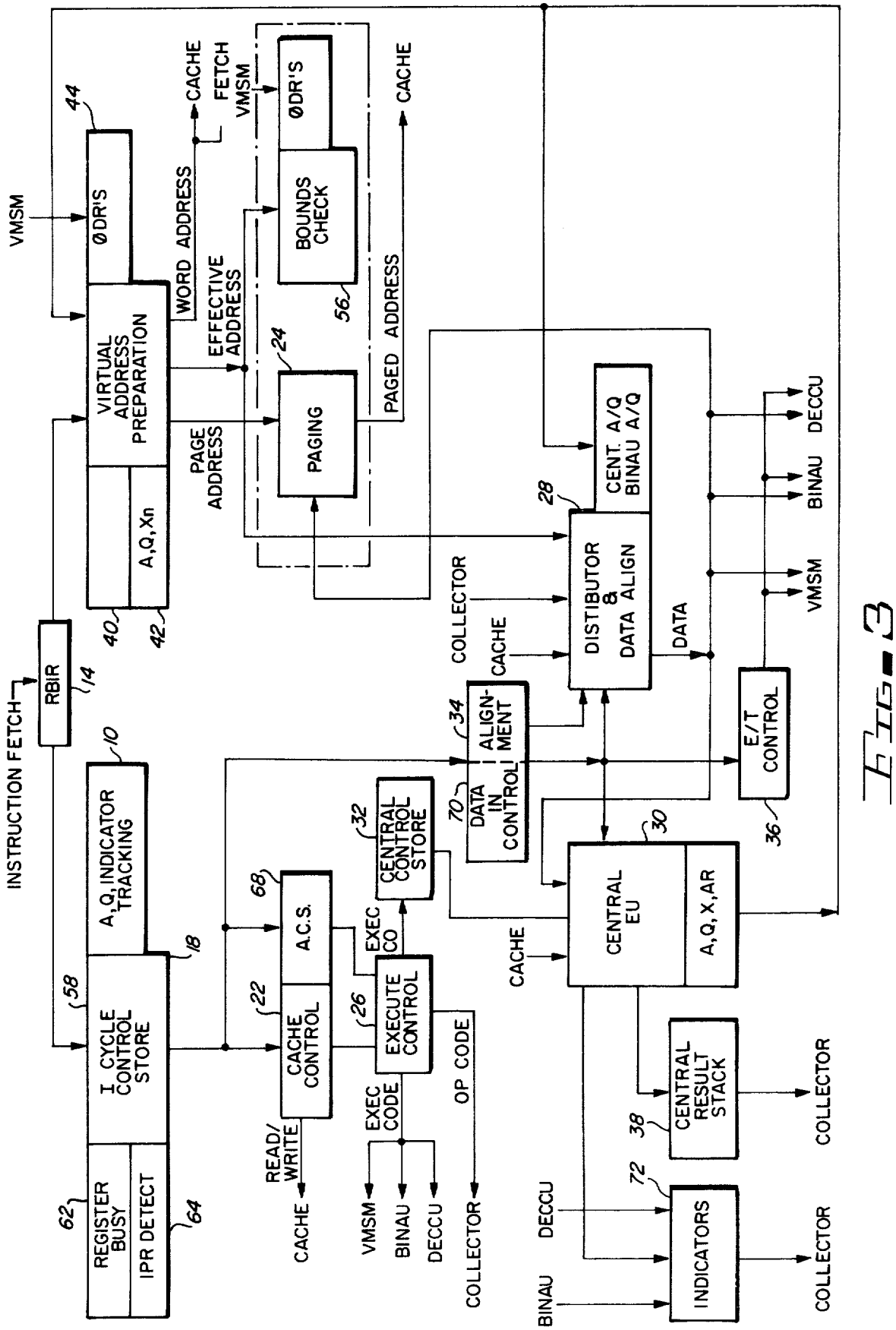
FIG. 3 is a functional block diagram providing additional details of the CEPU of the invention.

Referring to FIG. 1, the functions of central execution pipeline unit (CEPU) 10 are disclosed therein. The timing of these functions and the relationships between CEPU 10 and the other components of the central processor unit (CPU), of which CEPU 10 is a component, are also illustrated. Additional details of the CPU are set forth in a related application entitled Central Processor, which is identified in the section of this application entitled Cross-Reference to Related Applications. There are five or six stages, or cycles, in CEPU 10, depending upon whether one considers the updating functions, which occur in the execution plus one cycle (E1 cycle), as being a cycle, or stage, of CEPU 10. It should be noted that CEPU 10 is sometimes referred to as central unit pipeline structure (CUPS) 10. The six cycles are named the instruction cycle (I cycle), the address cycle (A cycle), the paging and cache access cycle (P/C cycle), the cache select cycle (C/S cycle), the execute or transmit cycle (E/T cycle), and the execution plus I cycle (E1 cycle) which is used to update indicator registers of CEPU 10. It should be noted that each cycle requires one clock period T to complete. The functional blocks on the left-hand side of FIG. 1 and those subsequent to the P/C cycle on the right side of FIG. 1 identify the control functions performed in the various stages, or cycles, of CEPU 10. The blocks on the right-hand side through the P/C cycle identify the address formation functions.

In a clock period, or cycle, prior to the I cycle of CEPU 10, an instruction word, or instruction, is read out of instruction fetch unit (IFU) 12 and is written into basic instruction register (RBIR) 14. The format of a preferred embodiment of an instruction word, or instruction, 16 is illustrated in FIG. 2. During the I cycle, the instruction field, or op code, bits 18–27 of instruction word 16, is decoded in instruction decode functional block 18 to provide signals representing various attributes of the op code being decoded, such as memory commands, or memory control signals, the number of clock period T required in the CEPU to execute the op code, what constitutes an illegal procedure condition, and any requirements for aligning data of the operand of the op code, or alignment control signals. During the I cycle, preparation is initiated in virtual address preparation functional block 20 of the virtual address of the target word, an operand or an instruction word, using address information of the instruction word 16 in RBIR 14. During the A cycle, the virtual address of the target word is completed and the lower order 11 bits of the virtual address are sent to the cache unit of the CPU so that the cache unit can begin the process of accessing, or obtaining, the target word from the cache unit. Also during the A cycle, A cycle control function block 22 transmits to the cache unit control signals produced by control block 18 during the I cycle, which control signals determine the type of operation to be performed by the cache unit; i.e., whether the cache unit is to perform a read operation or a write operation, for example. During the A cycle, the op code is again decoded in functional block 22 and produces an execution code and signals designating which one of a plurality, five including the collector in the preferred embodiment, of the execution units of the CPU is to execute the execution code so produced.

During the P/C cycle, the virtual page number of the virtual address, which is available at the conclusion of the A cycle, is converted by paging functional block 24 to a physical address, or real page number (RPN), which together with the word address is the location or address of the target word of the op code in the random access memory of the system. The RPN is delivered to the cache unit during the P/C cycle. P/C cycle control functional block 26 transmits to the designated execution unit the execution code produced during the A cycle.

During the C/S cycle, the cache unit, if the cache unit is conducting a read operation, checks to determine if the target word is in the cache unit and, if it is, the target word is transmitted to the distributor 28 and the central execution unit (CEU) 30. The execution code produced by the A cycle control 22 during the A cycle is transmitted to central control functional block 32 near the end of the P/C cycle by P/C cycle control 26. In central control block 32, the execution code is converted to execution unit control signals for CEU 30 if CEU 30 is the execution unit (EU) designated to execute that particular execution code. C/S cycle control functional block 34 transmits alignment control signals produced in the I cycle to distributor 28.

During the C/S cycle, if alignment is required with respect to the target word received during the C/S cycle, it is performed by distributor 28 during the C/S cycle and the addressed target word as aligned is transmitted from distributor 28 to the EU designated to perform an operation on it during the E/T cycle. A control signal from E/T cycle control functional block 36 enables the designated execution unit to receive the addressed target word from the distributor 28. During the E/T cycle, the op code of the instruction is also transmitted to the collector along with other information required by the collector. If the central execution unit is a designated execution unit, then it will perform its operation as determined by the control signals received from central control 32 on the target word received from the cache unit During the E1 cycle, the results of the execution of the instruction during the E/T cycle by central execution unit 30 are loaded into results stack 38 until such results are transmitted to the collector. At this time also the indicators of the central execution pipeline unit are updated.

In FIG. 3, additional details of CEPU 10 are illustrated. The virtual address preparation block 20 receives inputs from the central instruction counter register CIC 40, from the address, or displacement, field Y of the instruction word 16 in RBIR 14, from the A, Q, and X registers 42 and the operand descriptor registers (ODR) and instruction descriptor register (IDR) 44. The steps and the information utilized by block 20 in forming an effective address 46 and a virtual address 48 are illustrated in FIG. 4. The Y field of the instruction is added to the contents of the designated address register (ARn) and to the contents of the designated index register (XRn). When bit 29 is a "0", the ARn field is all zeros. When bit 29 of the instruction code 16 is a "1", the upper three bits 0, 1, and 2 of the address field Y designate an address register, the contents of which are to be added to the Y field, and bit 3, under these circumstances, is extended to bit positions 0, 1, and 2 to serve as a signed quantity. The tag field bits 30–35 may designate the index register, the A register, the Q register, or the instruction counter register, the contents of which are to be added to Y and AR to form the effective address 46. The effective address 46 is added to the descriptor base 50 and, combined with the working space number 52 to produce a virtual address 48, a 43-bit address to the byte level. The lower order bits 31–40 of virtual address 48 constitute the word address, the location of a machine word in a page of $2^{10}$, or 1K, contiguous words in the physical memory of the system. The word address plus bit 30 of the virtual address are transmitted to the cache and the I fetch unit 12. The upper 31 bits of the virtual address 48 are transmitted to paging unit 24. In paging unit 24 these 31 bits, by means of a set associative memory, are converted into the upper 16 bits, the physical page number, or the real page number (RPN) of the physical address, the format of which is illustrated in FIG. 5. The real page number, RPN, is transmitted to the cache unit so that the cache unit can complete the search of its directory to determine if the addressed target word is in the cache unit. The effective address 46 is transmitted to the bounds check functional block 56 where the magnitude of the effective address is compared with the bounds field of the descriptor to determine if the effective address exceeds the bounds established by the operating system software for the software program which includes that address. Effective address 46 is also transmitted to the distributor because certain types of instructions and tag modifications require the effective address as the operand thereof.

In instruction block 18, the instruction field of the op code of an instruction word 16 in RBIR 14 is used to access I cycle control store 58 which provides attributes for the instruction, which attributes are used to determine the updating of the A and Q registers by A/Q register-tracking functional block 60, for updating the register busy logic functional block 62 which determines whether a particular register is going to be busy while that instruction goes down, or passes through, CEPU 10. I cycle control store 58 provides information which is used by the illegal procedure function (IPR), functional block 64, which is used to detect illegal procedures. I cycle control store 58 also provides memory control signals to cache control logic block 22, which memory control signals determine the type of cache operation, a read, a write, etc., to be performed by the cache unit. The op code of the instruction is decoded by A cycle control store (ACS) 68, which produces the proper execution code and identifies the execution unit to execute that execution code which is designated by a 3-bit EU identifying number, or EU identifier. Execute control logic of the P/C cycle control 26 sends the execution code to the proper execution unit and the op code of the instruction to the collector during the E/T cycle.

C/S cycle control block 34 includes a data-in control function 70 which, in response to control signals from I cycle control store 58, specifies the type of data the instruction is to access, such as a sigle or a double word, whether the operation is a direct operation, etc. Control lines from data-in control 70 go to distributor 28 and to CEU 30 so that these functional blocks can perform data alignment operations on target words as they come from the cache unit. The execution code and execution unit identifier signals are also transmitted to central control store 32 which produces execution unit control signals for CEU 30 if CEU 30 is the designated EU. Additional data alignment control signals are transmitted to distributor 28 from C/S cycle control 34. E/T cycle control 36 enables the designated one of the VMSM, BINAU and DECCU execution units to receive the target words transmitted by distributor 28 so that the designated EU can execute the instruction utilizing the target word for that instruction.

CEU 30 is one of the five execution units and is the one that executes certain types of instructions, the so-called basic ops and shift instructions, for example. In CEU 30 are located a copy of the A, Q, and index (X) registers, as well as the address registers (ARn). In the clock period following the execution of an instruction by CEU 30, the E1 cycle, the results of the execution of that particular instruction on the addressed target are placed in the results stack 38 of CEU 30. The data in results stack 38 are unloaded by the collector unit in program order to update the master copy of these registers. At the same time, a register of indicator registers 72 is updated with the indicator signals resulting from that execution. Indicator signals are used to indicate that the results are a zero, the sign of the results, whether a carry is present, an overflow condition, a tally run out condition, etc. The indicator signals are transmitted to the collector unit so that it can update its master indicator registers. CEPU 10 has its own copy of the indicators which it receives from the various execution units of the CPU.

Figure 6:
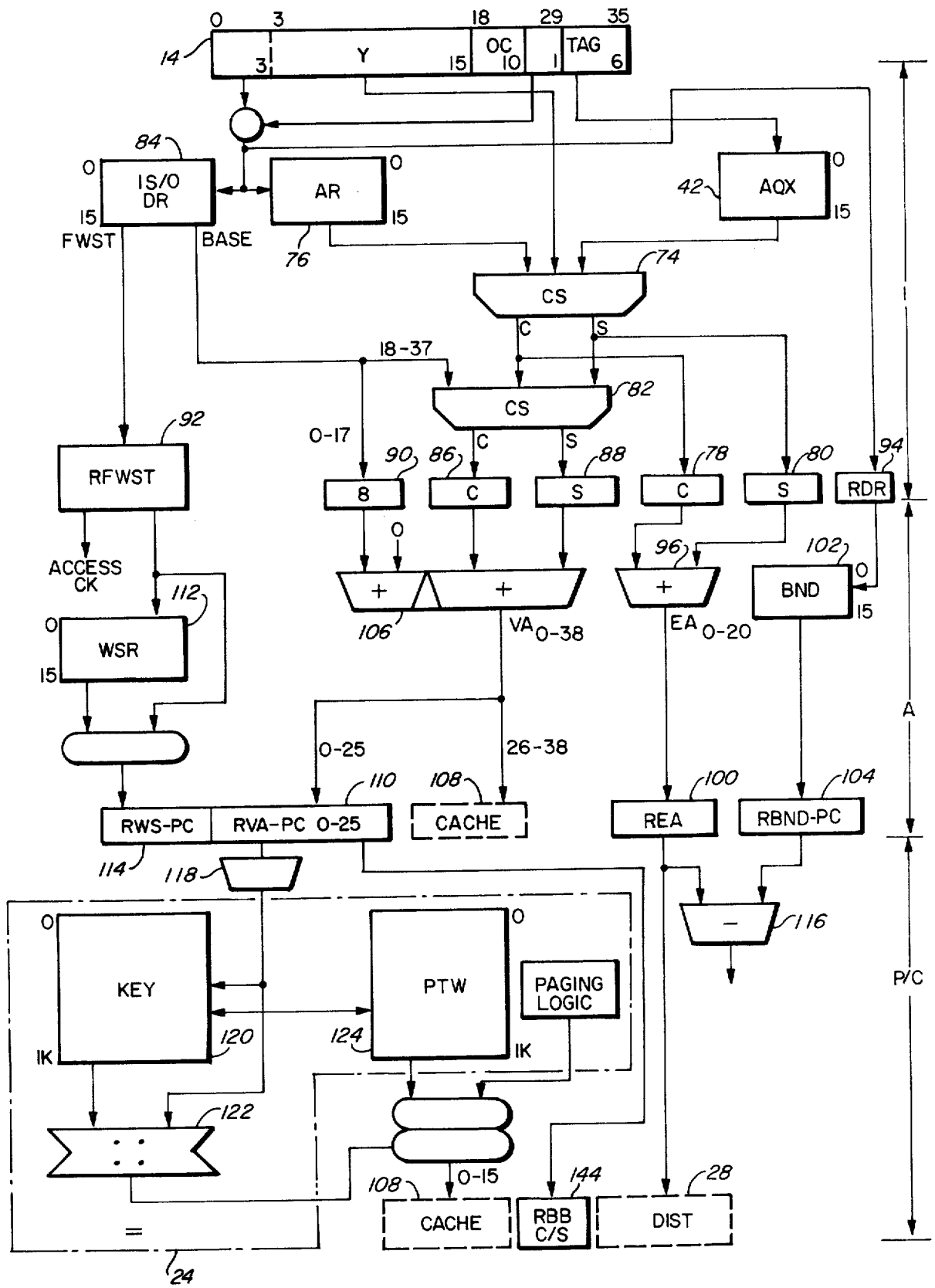
FIG. 6 is a schematic block diagram of the address formation logic of the CEPU.

In FIG. 6, details of the address formation logic are illustrated. During the first three stages, or cycles, of CEPU 10, the effective, the virtual, and the physical address of the target word of the instruction 16 in RBIR 14 at the beginning of the I cycle are prepared. During the I cycle, three input carry save adder 74 combines the contents of a designated one of the address registers (ARn) 76, the contents of one of a set of A, Q, IC, or X registers 42 designated by the tag field, bits 30-35 of the instruction word 16 in RBIR 14 and the Y, or displacement field, bits 0-17 of instruction 16. Which of the eight of the stack of address registers 76, in the preferred embodiment, is determined by bit 29, if set, and the upper three bits of the address field Y of instruction 16. The outputs of carry save adder 74 are saved in registers 78, 80. The two outputs and the carrys and sums are also applied to three input carry save adder 82. The third input to carry save adder 82 comes from descriptor register 84, a stack of registers which contains portions of eight operand discriptors (ODR) and an instruction segment descriptor (IDR). If bit 29 is a "1", the upper three bits of Y identify which of eight operand descriptors is to be used to form the virtual address. If bit 29 is a "0", the instruction segment descriptor is used in forming the virtual address. Each descriptor is, in the preferred embodiment, made up of two machine words, so that each descriptor includes a total of 72 bits. The base portion of the addressed descriptor is the third input to C/S adder 82. The carrys and sums of C/S adder 82 are saved in registers 86, 88. The upper 18 bits of the descriptor base are stored in register 90. The flags, working space register number, and type fields of the descriptor are stored in register RFWST 92, and the descriptor number in RDR 94. At the end of the I cycle, all the information needed to form the effective address and the virtual address is stored in registers 78, 80, 86, 88, 90, 92 and 94.

During the A cycle, the carrys and sums from registers 78 and 80 are added by full adder 96 to produce effective address 46, which is stored in effective address register REA 100. The descriptor number from register 94 is applied to the bounds register stack (BND) 102 to obtain the bounds field of the descriptor which is stored in bounds register RBND-P/C 104. The contents of registers 86, 88 and 90 are applied to full adder 106. The lower order 11 bits of the sum are sent to cache unit 108 and the upper bits are stored in register RVA-P/C 110. The working space field of the descriptor in register 92 is used to identify the working space register in the stack of working space registers WSR 112 and the addressed working space number from register 112 is written into register RWS-P/C 114. Thus, at the end of the A cycle, the information required to produce the RPN is stored in registers 110 and 114.

In the P/C cycle, the bounds check operation is executed by subtracting the effective address in register REA 100 from the bounds in register RBND P/C 104 by means of arithmetic logic unit 116. If the result is positive, then the effective address is within the bounds established for it. If the results are negative, an out-of-bounds fault has occurred and the operating system is so notified. The effective address is also transmitted to distributor 28. The relative virtual page number and working space number in registers 110, 114 have the upper two bits of the relative virtual page number (or)ed to the lower two bits of the working space number by logic unit 118 to produce the effective working space number and the virtual page number of the virtual address 48. Ten bits of the combined effective working space number and virtual page number are used to access a row in directory 120 and the contents of the addressed row are compared by comparator 122 with the balance of the bits constituting the effective working space and virtual page number of the virtual address. If a comparison is found by comparator 122, the real page number RPN is located in the same row in data array 124. The real page number is then transmitted from the data array 124 to the cache unit 108. Thus, at the end of the P/C cycle, the effective address, the word address and the real page number are formed and transmitted to the units of the system that need them subsequently.

Referring to FIG. 4, the formats of the Y field 126 of an instruction word 16, of an address register AR 128, and of an index or other register 130 specified by the tag field of an instruction 16 are illustrated, the informational content of which is added together to form effective address EA 46. The 24-bit effective address 46 is then added to the 36-bit descriptor base 50 to form 40-bit relative virtual address 132. It should be noted that the two lower order bits of descriptor base 50 are byte identifiers, or byte addresses. The two higher order bits of relative virtual address 132 are (or)ed with the two lower order bits of the 9-bit working space number 52 to form virtual address 48. The higher order 9 bits of virtual address 48 are defined as the effective working space number 134, bits 9-30 as virtual page number 136, bits 31-40 as word number 138, bits 41 and 42 as the byte address 140, and bits 43-46 as bit address 142. The byte and bit address bits of virtual address 48 which are not used by paging block 24 are stored in register RBB-C/S 144 for use in subsequent cycles or stages of CEPU 10 if required. Real page number 146, a 16-bit number, is appended to word address 138, a 10-bit number, to form the physical address 54, a 26-bit address in the preferred embodiment.

Figure 7:
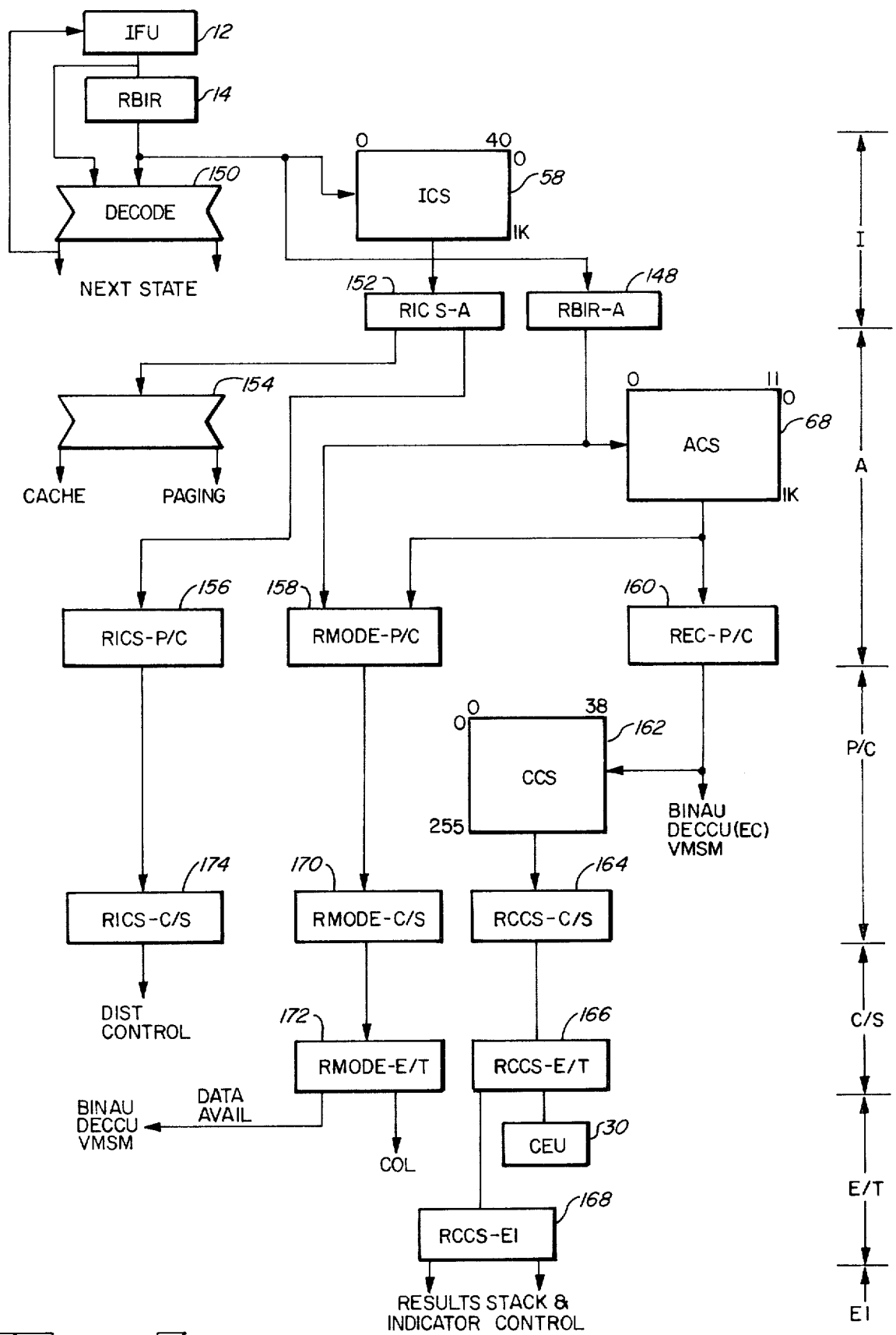
FIG. 7 is a schematic block diagram of the control logic of the CEPU.

In FIG. 7, additional details of the control logic of CEPU 10 are illustrated. During the I cycle, the op code of the instruction 16 in register RBIR 14 is used to access instruction cycle control store (ICS) 58. The types of information, or control, signals produced by ICS 58 include a 3-bit field which describes the type of memory command, or memory control signals, a delay field that describes the number of clock periods required for the CEPU 10 to execute the instruction, a field that describes illegal procedure (IPR) conditions for that instruction, a data alignment field for the target word for that instruction when read out of the cache unit, a register busy field which identifies which register is going to be busy as the instruction proceeds through the cycles of CEPU 10, a register field which identifies which register is to be updated, an A/Q last change field which describes whether the central execution unit (CEU) or the binary and arithmetic unit (BINAU) or both has the last valid copy of the A or Q registers of CEPU 10, and an indicator register last change field which describes which execution unit will change a particular indicator for that instruction.

At the end of the I cycle, the op code of the instruction in RBIR 14 is stored in register RBIR-A 148. During the A cycle, the op code in RBIR-A, 148 is used to access A cycle control store (ACS) 68. The output of ACS 68 includes a 3-bit field which specifies, or designates, which EU will execute the instruction and an 8-bit field which is the actual execution code sent to the designated EU. In the I cycle, the op code from RBIR 14 is applied to combinatorial logic 150 which, among other things, decodes the op code to determine if that instruction is one in which the address of the target word is formed in a manner other than that described above, or which requires special control sequencing. Examples of such instructions are repeats, multiword EIS, LREG, LAREG, SREG, SAREG, etc. In addition, logic 150 receives control signals from IFU 12 and transmits to IFU 12 a control read instruction (CRI) when an instruction is read out of the instruction stack of IFU 12 so that IFU 12 can update its pointers to point to the next instruction to be transmitted to RBIR 14. Information from ICS 58 is stored into register RICS-A 152 as a step in staging this information down, or through, the cycles, or stages, of CEPU 10.

In the A cycle, the memory command field is transmitted from RICS-A 152 to combinatorial logic 154, which provides appropriate memory control signals to the cache unit. The alignment control field passes down the pipeline and is stored in register RICS-P/C 156 at the end of the A cycle. The op code, execution code and EU designator fields are stored in register RMODE-P/C 158 while the op code and the EU designator signals from ACS 68 are stored in register REC-P/C 160, which is used to transmit the execution code to the designated EU during the P/C cycle. If the designated EU is CEU 30, the execution code is used to access central control store (CCS) 162. The output of CCS 162 is registered in register RCCS-C/S 164 at the end of the P/C cycle. The output of RCCS-C/S 164 is staged down to register RCCS-E/T 166 at the end of the C/S cycle. The output of RCCS-E/T 166 is then used to control CEU 30 in the E/T cycle. Certain fields of RCCS-E/T 166 are passed to register RCCS-E1 168. The signals of this field are used to control the results stack and indicators produced by the CEU 30 during the E1 cycle.

The information RMODE-P/C 158 is staged through registers RMODE-C/S 170 and RMODE-E/T 172. In the E/T cycle, the op code is passed, or transmitted, to the collector, and a signal is transmitted to the designated EU, the BINAU, DECCU, or VMSM, to enable the designated EU to receive the operand from distributor 28. Alignment control signals in register RICS-P/C 156 are staged to register RICS-C/S 174 and are then passed to distributor 28 during the C/S cycle.

Referring to FIG. 8, in which the details of distributor 28 are illustrated, data input register RD 176 is the primary data register for the various execution units of the CPU, of which the CEPU 10 is a component. Data from RD 176 is sent to all the execution units, the VMSM, the DECCU, BINAU, as well as the CEU. It is also the primary input register for transmitting information to the paging logic, or functional block 24, and to CEPU 10. The primary input to RD 176 comes from the cache unit. On all occasions in which the addressed target word is in the cache unit, the data comes directly from the cache unit into double word register RD 176. Data from the cache is always provided as a double word, 72 bits in the preferred embodiment. Data register switch 177 of distributor 28 aligns one of these words if a single word is required by one of the units. Another input to distributor 28 comes from the collector unit. The collector input is used if the addressed target word is not in the cache unit, and it is also used in some other special cases; for example, where the collector sends instructions to the I fetch unit. The collector unit also provides the information to update the BINAU copy of A/Q register 178 of distributor 28. Another input to distributor 28 comes from CEU 30. This input is stored into central A/Q register 180. Any time the CEU 30 updates its A or Q registers, the A/Q register 180 of distributor 28 is updated one cycle later. Thus, the central A/Q register 180 will always be updated one cycle after the A and Q registers of the central execution unit 30 are updated. The register REA 182 receives the effective address from REA register 100, which is illustrated in FIG. 6. The contents of register REA 182 are used on so-called direct operations; i.e., ones in which at least a portion of the effective address is used as the operand. The effective address is loaded into REA 182 during the P/C cycle. From there, it is aligned and loaded into RD register 176 when the instruction is a direct operation.

Any time the BINAU updates its A/Q registers, BINAU A/Q register 178 is updated by signals transmitted from the collector. Thus, at any given point in time, register 178 of distributor 28 will have the latest update of the A and Q registers of the BINAU unit, as well as the latest update of the A and Q registers of central execution unit 30. Distributor 28 is provided with a set of character alignment switches 184. When character modification type of alignment instructions are being executed, such as sequence character, sequence character reverse, it is necessary to first write the target data into RD register 176. On the next cycle, this data is aligned in accordance with the requirements of the instruction by transmittal through character alignment switch 184 and the output of switch 184 is then loaded back into RD register 176. The word alignment set of switches 186 is used to align words or to form direct operands which are then written into RD register 176 for transmission to the execution unit requiring it in order to execute an instruction using that data. The set of switches ZDI 188 selects as its output the signals applied to it, which output is transmitted directly to IFU 12 or to the central unit 30, as well as to switch 177 for storage in RD register 176. The direct path from ZDI 188 is used to pass instructions from the collector to IFU 12 and also to pass direct operands to the CEU. In the case of a double word operation, the direct path is used to pass the even or odd word to the CEU 30.

The flow or passage of instructions through CEPU 10 is illustrated in FIG. 9. The sequence of instructions for a load A register LDA, and add to A register ADA, a load A and Q register LDAQ, and a load Q register LDQ. AS the instruction LDA starts down CEPU 10, when it is in the I cycle, a preliminary decode is made to determine whether it is a basic one execution cycle instruction. Since it is, the CEPU immediately brings in the next instruction which is ADA into the I cycle stage one clock period later. During the I cycle, the first part of the address preparation of the effective address and the virtual address of the instruction LDA is started. As the instruction LDA moves into the A cycle, the preparation of the virtual address is completed and the lower order bits are sent to the cache unit and the upper bits of the virtual address go to the paging logic. During the A cycle, read control signals are sent to the cache unit. As the instruction LDA moves into the P/C cycle, the page address is sent to the cache, a bounds check is made, an access is made to the A cycle control store and the execution code from the A cycle control store is sent to the designated execution unit. Also in this cycle the cache access function is performed. As the instruction LDA moves into the C/S cycle, the cache data is selected and, if the target word or words are in the cache unit, the target words are sent to the distributor 28 and to the central execution unit 30. Load A instruction then moves into the E/T cycle, during which it is executed and the operand is loaded into the A register of the central execution unit 30. As the instruction load A moves into the E1 cycle, the result of the execution of the instruction load A in central execution unit 30 is loaded into results stack 38 for transmission to the collector, at which time the indicators are updated and the central A/Q register 180 of distributor 28 is updated. Similarly, each of the instructions proceeds through the same set of stages. It should be noted that the load A/Q instruction requires two cycles, so that the next instruction in the sequence, load Q, is held one cycle.

From the foregoing, it is believed obvious that this invention provides a central execution pipeline unit which initiates the execution of instructions, forms the addresses of the target words of each instruction, obtains the target words and distributes the necessary control information to the designated execution units so that the designated execution units may perform the desired operation on the target word in a manner which maximizes the performance of the central processor unit of which the central execution pipeline unit is a subsystem.

What is claimed is:

1. In a synchronous central processor of a digital data processing system having a cache unit, a plurality of execution units, a collector, and an instruction fetch unit; a central execution pipeline unit (CEPU) having a plurality of stages comprising:

means for obtaining and loading an instruction word containing an address and instruction information into a basic instruction register (BIR);

a first stage including first address means utilizing the address information of the instruction word in the basic instruction register for forming the carrys and sums of an effective and a virtual address, and control means for decoding the instruction information to produce memory command signals and data alignment control signals;

a second stage including second address means for forming the effective address and to form the virtual address, which virtual address includes a word address portion; means for sending the word address portion of the virtual address to the cache unit, and second control means for issuing the memory command signals to the cache unit and for converting the instruction information to a set of execution code signals and signals designating the execution unit to execute the execution code;

a third stage including third address means for converting the virtual address to a physical address including a physical page number, means for sending the physical page number to the cache unit, third control means for sending the execution code produced in the second stage to the designated execution unit, and means for converting the execution code into execution unit control signals if the central execution unit is the designated execution unit;

a fourth stage including fourth control means for transmitting the data alignment control signals to a distributor means for aligning the addressed target word transmitted from the cache;

a fifth stage including fifth control means to enable the addressed execution unit to receive the addressed target word from the distributor means, and for transmitting the instruction field to the collector, said central execution unit, if designated, executing the instruction on the addressed target word; and a sixth stage including control means for loading the results of the execution of an instruction by the central execution unit during the fifth stage on the addressed target word received from the cache unit during the fourth stage into a results stack, and for updating the indicators of the central execution pipeline unit.

2. In a synchronous central processor as defined in claim 1 in which the address information includes an address field and a tag field.

3. In a synchronous central processor as defined in claim 2 in which the means for decoding the instruction information is an addressable first control store means.

4. In a synchronous central processor as defined in claim 3 in which the means for converting the instruction information to execution code signals in the second stage is an addressable second control store means.

5. In a synchronous central processor as defined in claim 4 in which the means for converting the virtual address to a physical address includes a set associative memory means.

6. In a synchronous central processor as defined in claim 5 in which the means for converting execution codes into execution unit control signals for the central execution unit is a third addressable control store means.

7. The method of initiating the execution of instructions in a synchoronous central processor of a digital data processing system having a cache unit, a plurality of execution units, a collector, an instruction fetch unit; comprising the steps of:

obtaining an instruction word containing address and instruction information from the instruction fetch unit;

during a first cycle, utilizing the address information of the instruction word to form the carrys and sums of an effective and a virtual address, and decoding the instruction information to produce memory command signals and data alignment control signals;

during a second cycle, completing the formation of the effective address and the virtual address, which virtual address includes a word address portion; sending the word address portion of the virtual address to the cache unit, issuing the memory command signals to the cache unit, and converting the instruction information to a set of execution code signals and signals designating the execution unit to execute the execution code;

during a third cycle, converting the virtual address to a physical address including a physical page number, sending the physical page number to the cache unit, sending the execution code produced in the second stage to the designated execution unit, and converting the execution code into execution unit control signals if the central execution unit is the designated execution unit;

during a fourth cycle, aligning the addressed target word transmitted from the cache;

during a fifth cycle, enabling the addressed execution unit to receive the addressed target word, transmitting the instruction information to the collector, said central execution unit, if designated, executing the instruction on its addressed target word; and during a sixth cycle, loading the results of the execution of an instruction by the central execution unit during the fifth stage on the addressed target word received from the cache unit during the fourth stage into a results stack.

8. The method of claim 7 in which the time period of each cycle equals a clock period of the central processor.

9. The method of claim 8 in which the address information of the instruction includes a displacement field.

10. The method of claim 9 in which the address information of the instruction also includes a tag field.

* * * * *